United States Patent [19]

Onder

[11] 4,017,459
[45] Apr. 12, 1977

[54] POLYAMIDE-IMIDES
[75] Inventor: Besir K. Onder, North Haven, Conn.
[73] Assignee: The Upjohn Company, Kalamazoo, Mich.
[22] Filed: Sept. 19, 1975
[21] Appl. No.: 614,838
[52] U.S. Cl. .................... 260/47 CP; 260/47 CB; 260/47 CZ; 260/453 R
[51] Int. Cl.$^2$ ........................................ C08G 73/14
[58] Field of Search ........ 260/47 CZ, 47 CP, 47 CB

[56] References Cited
UNITED STATES PATENTS

| 3,505,288 | 4/1970 | Bodesheim et al. | 260/47 CZ |
| 3,573,260 | 3/1971 | Morello | 260/47 CP |

OTHER PUBLICATIONS

New Linear Polymers, Lee et al., 1967, pp. 171–204, McGraw Hill Book Co.

Primary Examiner—V. P. Hoke
Attorney, Agent, or Firm—Denis A. Firth; John Kekich

[57] ABSTRACT

Polyamide-imides are described which are derived by conventional procedures from 2,2-bis[4-(p-aminophenoxy)-phenyl]propane (or the corresponding diisocyanate) and trimellitic acid (preferably through the anhydride acid chloride). Copolyamide-imides derived from trimellitic acid, the above diamine (or diisocyanate) and certain other aromatic diamines or diisocyanates (4,4'-diaminodiphenyl ether, m-phenylene diamine and corresponding diisocyanates are preferred) are also described. The above polyamide-imides are engineering thermoplastics which, unlike closely related polyamides and polyimides, can be extruded and injection molded to form parts having good mechanical properties.

5 Claims, No Drawings

POLYAMIDE-IMIDES

BACKGROUND OF THE INVENTION

1. Field of the Invention

This invention relates to novel polyamide-imides and to methods for their preparation and is more particularly concerned with polyamide-imides derived from 2,2-bis[4-(p-aminophenoxy)phenyl]propane or the corresponding diisocyanate and with methods for their preparation.

2. Description of the Prior Art

Polyamides and polyimides derived from aromatic polycarboxylic acids and 2,2-bis[4-(p-aminophenoxy)-phenyl]propane are known. Solvent soluble polyimides derived from aromatic tetracarboxylic acids (or anhydrides) and certain ether-sulfone diamines are described in U.S. Pat. No. 3,563,951. It is there disclosed that a minor proportion of the ether-sulfone diamine can be replaced by any one of a number of other diamines, including 2,2-bis[4-(p-aminophenoxy)-phenyl]propane, without detracting from the solvent soluble properties of the polyimide.

It has been found, however, that the polyimides prepared from aromatic tetracarboxylic acids and 2,2-bis[4-(p-aminophenoxy)phenyl]propane alone lack the solvent solubility and, more particularly, are not melt processable, i.e. they are not useful in the preparation of extruded or injection molded parts.

The preparation of polyamides from aromatic dicarboxylic acids and 2,2-bis[4-(p-aminophenoxy)phenyl]-propane is described in U.S. Pat. No. 3,505,288. Such polyamides also suffer from lack of melt processability and cannot be extruded or injection molded to give useful mechanical parts.

The present invention is based on the finding that polyamide-imides derived from trimellitic acid or anhydride and 2,2-bis[4-(p-aminophenoxy)phenyl]propane or the corresponding diisocyanate are melt processable, unlike very closely related polyamides, on the one hand, and closely related polyimides on the other, and can be used to prepare mechanical parts having good properties by injection molding techniques.

SUMMARY OF THE INVENTION

This invention comprises an injection-moldable polyamideimide which is the product of reaction of substantially stoichiometric proportions of a. a member selected from the class consisting of 2,2-bis[4-(p-aminophenoxy)phenyl]propane and 2,2-bis[4-(p-isocyanatophenoxy)phenyl]propane; and b. a member selected from the class consisting of trimellitic acid, trimellitic anhydride and, in the case wherein reactant (a) is the diamine, an acid halide of trimellitic anhydride.

The invention also comprises copolyamide-imides in which up to 50 molar percent of reactant (a) is replaced by another aromatic diamine or diisocyanate as hereinafter defined and exemplified.

DETAILED DESCRIPTION OF THE INVENTION

The polyamide-imides of the invention are prepared by the reaction of the known diamine, namely, 2,2-bis[4-(p-aminophenoxy)phenyl]propane (I) [prepared, for example, as described in U.S. Pat. No. 3,505,288, Example 3(b)] or the corresponding diisocyanate (II), which is a novel compound prepared by phosgenation of the diamine as described hereinafter, with trimellitic acid, trimellitic anhydride or in the case of the diamine, with an acid halide of trimellitic anhydride. The reaction is carried out under conditions known in the art for the preparation of polyamide-imides; see, for example, U.S. Pat. No. 3,260,691.

Illustratively, where the diamine is employed, the latter is reacted with a substantially equimolar proportion of the acid halide, preferably the acid chloride, of trimellitic anhydride in the presence of a dipolar aprotic solvent such as dimethylformamide, dimethylacetamide, tetrahydrofuran, dioxan, acetonitrile, N-alkyl-2-pyrrolidones such as N-methyl- and N-ethyl-2-pyrrolidones, tetramethylene sulfone and the like. The reaction is carried out advantageously at a temperature within the range of about −25° C to about 100° C and preferably at a temperature of about −20° C to about 25° C. Advantageously, the anhydride acid halide is added as a solid to the diamine solution.

In this first stage of the reaction the principal reaction occurring is represented schematically as follows:

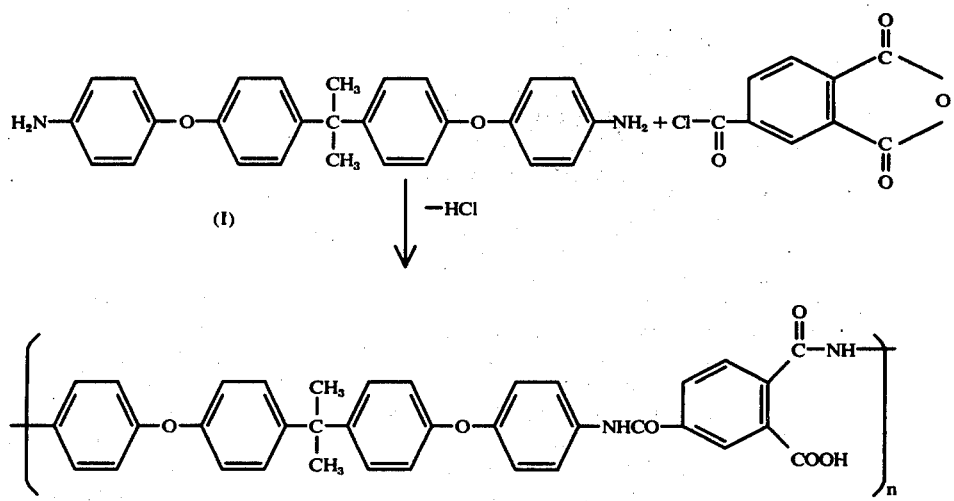

where n is integer having an average value of at least about 15.

In the second stage of the reaction the polyamide acid which is formed in the first step, and which generally separates as a precipitate from the reaction product or can be precipitated therefrom by addition of an appropriate liquid in which the polyamide acid is not soluble, is isolated and subjected to cyclization to form the desired amide-imide. The cyclization is effected using any of the methods known in the art for converting polyamide acid intermediates to polyamide-imides. For example, cyclization is effected by heating the intermediate polyamide acid at a temperature of about 150° C to about 250° C under reduced pressure. The water eliminated in the cyclization is thereby removed on a continuous basis and the heating is continued until cyclization is complete.

The course of reaction in the aforesaid first and second steps can be followed readily using routine analytical procedures carried out on aliquots of the reaction mixture. Such routine techniques include infrared and nuclear magnetic resonance spectroscopy, and the like.

The polyamide-imides of the invention can also be prepared in a single stage process by interaction of substantially stoichiometric proportions of 2,2-bis[4-(p-isocyanatophenoxy)phenyl]propane and trimellitic acid or, preferably, the anhydride. The reaction is carried out in the presence of a dipolar aprotic solvent such as those set forth above at a temperature within the range of about 50° C to about 200° C and preferably at a temperature in the range of about 100° C to about 150° C. Advantageously, the reaction is carried out in the presence of a catalyst for the reaction of an isocyanate and a carboxylic acid and/or anhydride group. Such catalysts are well-known in the art; see, for example, U.S. Pat. No. 3,701,756 and my copending applications Ser. Nos. 521,744 and 521,745 filed Nov. 7, 1974. Illustrative of such catalysts are the alkali metal salts of lactams such as sodium, potassium and lithium butyrolactamates, sodium, potassium and lithium valerolactamates, sodium, potassium and lithium caprolactamates, alkali metal alkoxides and aryloxides such as sodium, potassium and lithium methoxides, ethoxides, butoxides, and phenoxides, and the like.

The reaction between the diisocyanate and trimellitic acid or anhydride is carried out under substantially anhydrous conditions and the progress of the reaction can be followed by any of the routine analytical techniques such as those set forth above in regard to the reaction of the diamine with trimellitic acid or derivatives thereof. The polyamide-imide produced by the reaction generally separates from the reaction mixture or can be precipitated therefrom by addition of an appropriate liquid in which the polyamideimide is insoluble or has low solubility.

The polyamide-imides formed by the above two routes are indistinguishable from each other in terms of physical properties and in terms of the properties of molded products derived therefrom.

The polyamide-imides of the invention are solid materials having a molecular weight, number average (Mn), within the range of about 5,000 to about 15,000 and a molecular weight, weight average (Mw), in the range of about 10,000 to 120,000 and inherent viscosities in dimethylacetamide of the order of about 0.4 to about 1.5. These materials can be molded using a variety of techniques including compression molding and, more particularly, injection molding. Thus, a standard Gehman Torsional Stiffness Test (ASTM D-1053-58T) shows that the polymers of the invention exhibit a rubbery state over a narrow range of temperature of about 230° to 270° C and that, immediately above the latter temperature, the polymers of the invention go to a melt transition state in which the modulus drops below $10^6$ dynes/cm$^2$. This melt flow behaviour renders the polymers of the invention highly useful for injection molding and extrusion.

In contrast it has been found that polyamides prepared from isophthalic acid and the diamine (I) employed in preparing the polymers of the invention show entirely different behaviour in the Gehman Test. These polyamides resist melt flow after a rubbery state in the range of 220 to 280° C and the modulus remains at a high of $10^7$ dynes/cm$^2$ up to a temperature of about 360° C. This means that the polyamides in question cannot be injection molded in a satisfactory manner. Similarly, closely related polyimides prepared from the above diamine and either benzophenone tetracarboxylic acid dianhydride or pyromellitic acid dianhydride do not show any melt flow in the same temperature range as the polymers of the invention and are not injection moldable.

It has further been found that a portion of the diamine (I) or the corresponding diisocyanate (II) employed in preparing the polyamide-imides of the invention can be replaced by other aromatic diamines, or the corresponding diisocyanates, without detracting significantly from the valuable properties, including the capability of injection molding, of the polyamide-imides of the invention. Such copolyamide-imides also form part of the present invention. In general up to about 50 mole percent of the diamine (I) or diisocyanate (II) can be replaced in this manner, but, in certain instances, higher proportions can be replaced without detracting significantly from the useful properties of the polyamide-imides of the invention. Thus, up to 50 molar percent of the diamine (I) can be replaced by m-phenylene diamine or 4,4'-diaminodiphenyl ether and there is still obtained a polyamide-imide of the invention having highly useful properties. Similarly, when the polyamide-imides of the invention are prepared from the diisocyanate (II), up to 50 molar percent of the latter can be replaced by one or both of m-phenylene diisocyanate or 4,4'-diisocyanatodiphenyl ether.

The above findings are useful from a commercially practical standpoint. Thus, the diamine (I) and the diisocyanate (II) are relatively more expensive than some of the diamines or diisocyanates set forth above which can be substituted therefor. It is therefore possible, by such substitution, to reduce significantly the materials cost of the polymers of the invention.

Aromatic diamines which, in addition to those named above, can be employed to replace a part of the diamine (I) to produce copolyamides of the invention include di(4-aminophenyl)methane, p-phenylenediamine, 4,4'-diaminodiphenyl, 1,5-naphthalenediamine, 4,4'-diaminodiphenylsulfone, 2,4-diaminotoluene, 2,6-diaminotoluene, isopropylidene dianiline and α,α-di(-trifluoromethyl)-4,4'-diaminodiphenylmethane.

Aromatic diisocyanates which, in addition, to those named above, can be employed to replace a part of the diisocyanate (II) include 4,4'-methylenebis(phenyl isocyanate), p-phenylene diisocyanate, 4,4'-diisocyanatodiphenyl, 1,5-naphthalenediisocyanate, 4,4'-diisocyanatodiphenylsulfone, 2,4-toluene diisocyanate, and 2,6-toluene diisocyanate and mixtures of two or more of these diisocyanates.

The polyamide-imides of the invention are engineering thermoplastics which can be employed in the fabrication, by molding, of a variety of articles which possess high structural strength and resistance to deformation or degradation at relatively high temperatures. Such articles include gears, ratchets, clutch linings, transmissions, conduits, bushings, pistons, piston rings, compressor vanes and impellers, thread guides, cams, brake linings, abrasive materials, electrical components, connectors, under the hood automotive parts.

It is believed that the polyamide-imides of the invention are characterized by the presence of at least two randomized recurring units which are represented by the following formulae:

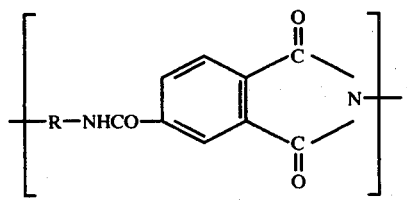

and

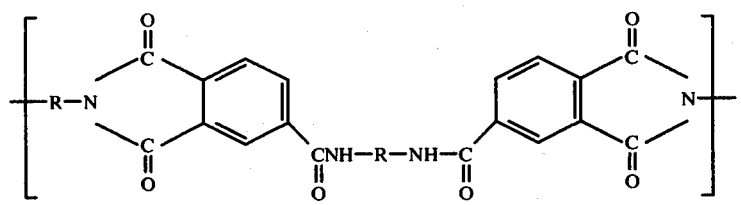

wherein R in each case represents

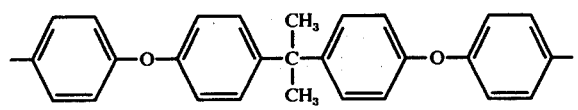

It is believed that the second named unit above is the one which predominates in the polymer, but the exact proportions, and the order in which the units recur, cannot be determined by methods presently available.

As set forth above, the diisocyanate (II) is a novel compound which can be prepared by conventional techniques by phosgenation of the corresponding diamine (I). For example, the diamine (I), or an acid addition salt thereof such as the dihydrochloride, dihydrobromide, and the like, is treated with phosgene in the presence of an inert organic solvent such as benzene, toluene, xylene, naphthalene, decalin, chlorobenzene, o-dichlorobenzene, bromobenzene, o-chlorotoluene, and the like. The reaction is conducted advantageously at low temperatures (0° to 20° C) in the initial stages and later at elevated temperatures and preferably at temperatures of the order of 100° to 200° C. The phosgene is conveniently employed in approximately stoichiometric proportions but an excess of phosgene can be employed if desired. In a modification of the above process the free diamine (I) in an inert organic solvent, as exemplified above, is treated with carbon dioxide to form the corresponding carbonate and then the latter is reacted with phosgene as described above. The above methods of phosgenation are well described and summarized by Siefken, Annalen, 562, 75 et seq., 1949.

The diisocyanate (II) is isolated from the phosgenation reaction product by conventional procedures. For example, the reaction product is purged of excess phosgene using an inert gas such as nitrogen and the inert organic solvent is removed by distillation. The residue is purified by recrystallization, or like procedures, to give the diisocyanate (II) in the form of a crystalline solid.

The diisocyanate (II), in addition to its usefulness in preparing the novel polyamide-imides of the present invention, is also useful in the preparation of other high temperature resistant polymers. For example, it can be converted for example, using the techniques described in U.S. Pat. Nos. 3,397,253; 3,591,562; 3,609,113; 3,635,905; 3,645,978; 3,661,859; and 3,684,773, to the corresponding polyparabanic acids. The latter are possessed of excellent physical properties and can be molded, by techniques well-known in the art, into fabricated products having outstanding resistance to deformation by heat and having excellent structural strength.

The following examples describe the manner and process of making and using the invention and set forth the best mode contemplated by the inventor of carrying out the invention but are not to be construed as limiting.

EXAMPLE 1

A solution of 61.5 g. (0.15 mole) of 2,2-bis[4-(p-aminophenoxy)phenyl]propane [U.S. Pat. No. 3,505,288] in 200 ml. of anhydrous dimethylacetamide was stirred under nitrogen in carefully predried equipment while a total of 31.5 g. (0.15 mole) of the powdered acid chloride of trimellitic anhydride was added in increments over a period of 15 minutes. The temperature rose to a maximum of 45° C. The last of the acid chloride powder was rinsed in using dimethylacetamide and the resulting mixture was stirred under nitrogen at room temperature (circa 20° C) overnight (approximately 15 hours). The resulting mixture was treated with deionized water to precipitate the polyamide acid. The latter was comminuted using a Waring blender, filtered off and dried in vacuo. The temperature during the drying operation was gradually increased to 180° C and maintained at that temperature for 12 hr.

There was thus obtained a polyamide-imide having the recurring unit (I) and exhibiting an inherent viscosity ($\eta$ 0.5) in dimethylacetamide of 0.404.

EXAMPLE 2

A solution of 205 g. (0.5 mole) of 2,2-bis[4-(p-aminophenoxy)phenyl]propane in 750 ml. of anhydrous dimethylacetamide was stirred under nitrogen at 10° C in previously dried equipment while 105.3 g. (0.5 mole) of the powdered acid chloride of trimellitic anhydride was added incrementally over a period of 15 minutes. The temperature of the reaction mixture rose to a maximum of 33° C during the addition. The resulting mixture was stirred at room temperature (circa 20° C) for 4 hr. after which two portions, each of 0.26 g., of the acid chloride were added with an interval of 2 hours separating the additions. The resulting mixture was stirred for a further 15 hours at room temperature. At the end of this time, an infrared spectrum of an aliquot showed no excess of acid chloride. Accordingly, a further 0.26 g. of acid chloride was added and the mixture was stirred for 2 hours and then was poured into deionized water. The resulting product was allowed to stand for 1.5 hours and was then comminuted using a Waring blender. The solid was isolated by filtration, washed with acetone and then with isopropanol and dried under nitrogen at 80° C. The solid polyamide acid so obtained was heated in vacuo at 180° C for 10 hours to yield a polyamide-imide having the recurring unit (I). The polymer exhibited an inherent viscosity ($\eta$ 0.5) in dimethylacetamide of 0.65.

EXAMPLE 3

A solution of 176.25 g. (0.43 mole) of 2,2-bis[4-(p-aminophenoxy)phenyl]propane in 1075 ml. of dimethylacetamide (previously dried over calcium hydride) was maintained under nitrogen at −15° C with stirring while a total of 90.53 g. (0.43 mole) of the powdered acid chloride of trimellitic anhydride was added over a period of 15 minutes. The temperature of the reaction mixture was not allowed to rise above 0° C during the addition. When the addition was complete, the mixture was stirred and maintained at −10° C for 1 hour. Thereafter the mixture was allowed to rise to room temperature (circa 20° C) and maintained thereat for 15 hours with stirring. A further portion of 0.26 g. of acid chloride was then added to the reaction mixture and the latter was stirred for a further 2 hours at room temperature before being poured into deionized water. The resulting precipitate was comminuted using a Waring blender, isolated by filtration, suspended in methanol and again filtered. The polyamide acid so obtained was heated in vacuo at 180° C for 12 hours. There was thus obtained a polyamide-imide having the securring unit (I) and exhibiting an inherent viscosity ($\eta$ 0.5) of 0.76.

EXAMPLE 4

A solution of 205 g. (0.5 mole) of 2,2-bis[4-(p-aminophenoxy)phenyl]propane in 750 ml. of dimethylacetamide (previously dried over calcium hydride) was maintained under nitrogen at −25° C with stirring while a total of 105.3 g. (0.5 mole) of the powdered acid chloride of trimellitic anhydride was added incrementally over a period of 15 minutes. The temperature of the reaction mixture was not allowed to rise above −15° C during the addition. After the addition was complete, the traces of acid chloride deposited on the funnel used for the addition were rinsed into the reaction mixture using 400 ml. of anhydrous dimethylacetamide and the reaction mixture was allowed to come to room temperature (circa 20° C) and was stirred thereat for 15 hours. The resulting mixture was poured into a large excess of deionized water. The product so obtained was allowed to stand for 2 hours and then comminuted using a Waring blender. The powdered solid was isolated by filtration, washed with deionized water and then with isopropanol. The polyamide acid so obtained was heated at 180° C in vacuo for 12 hours to obtain a polyamide-imide having the recurring unit (I) and exhibiting an inherent viscosity ($\eta$ 0.5) in dimethylacetamide of 0.81.

EXAMPLE 5

Four further batches of polyamide-imide were prepared using the procedure described in Example 4, the only variation between batches being the initial and maximum temperatures employed in the reaction mixture. The details of these temperatures and the inherent viscosity (in dimethylacetamide) of the products obtained are as follows:

| Batch | Initial Temp. ° C | Max. Temp. ° C | $\eta$ 0.5 |
|---|---|---|---|
| A | −20 | 0 | 1.17 |
| B | −25 | 0 | 1.36 |
| C | −20 | −5 | 1.05 |
| D | −20 | 0 | 1.03 |

EXAMPLE 6

The various batches of polyamide-imide prepared as described in Examples 1 through 5 were each milled to a fine powder and then dry blended using a mechanical blender. The blended polymer was divided between two trays and dried in a vacuum oven at 190° C for 12 hours. The inherent viscosities (in dimethylacetamide) of the material on the two trays were 0.79 (top tray in oven) and 0.92 (bottom tray in oven).

The material from the top tray was then extruded as strands (⅛ inch diameter) using a Brabender vented extruder fitted with a screw of L/D ratio of 25:1 and having a 4:1 compression ratio. The temperature settings in the various zones were:

| Zone | Temp. ° C |
|---|---|
| 1 | 325 |
| 2 | 325 |
| 3 | 325 |
| 4 | 325 |

The speed of rotation of the screw was 40 rpm. The strands so extruded were of excellent, transparent, shiny appearance and were readily pelletized using a standard chopper. The pellets so obtained were then injection molded as follows:

An Arburg reciprocating screw injection molding machine was used. The operating conditions were:

| Barrel temperature | : | 335 – 340° C |
|---|---|---|
| Nozzle temperature | : | 340° C |
| Injection pressure | : | 1050 psi |
| Mold temperature | : | 170 – 175° C |
| Mold cycle | : | 45 seconds |

Standard ASTM flex bars and tensile bars were obtained by the injection molding. The properties of these test pieces were:

| | |
|---|---|
| Density | : 1.25 gm/cc |
| Tensile strength | : 14,000 psi |
| Tensile modulus | : 240,000 psi |
| Elongation | : 25% |
| Flexural strength | : 17,700 psi |
| Flexural modulus | : 386,000 psi |
| Izod impact "notched" | : 3 – 5 ft. lbs./in. |
| Compressive strength | : 15,000 psi |
| Rockwell hardness | : 96 (M scale) |
| Heat distortion temperature (HDT) at 264 psi | : 21° C |

EXAMPLE 7

For purposes of comparison, a polyamide was prepared using substantially the procedure described in Example 3 of U.S. Pat. No. 3,505,288.

A solution of 37.6 g. (0.0917 mole) of 2,2-bis[4-(p-aminophenoxy)phenyl]propane in 150 ml. of anhydrous dimethylacetamide was cooled to −20° C and stirred under nitrogen while a solution of 18.61 g. (0.0917 mole) of the diacid chloride of isophthalic acid was added over a period of 15 minutes. The temperature of the reaction mixture was maintained below 0° C during the addition. After the addition was complete, the temperature of the reaction mixture was allowed to rise to room temperature (circa 20° C), the viscous solution was diluted with 100 ml. of dimethylacetamide and the solution was allowed to stand overnight at room temperature. The product was then poured into a large excess of deionized water containing 30 g. of sodium carbonate. The precipitate (strands) was allowed to stand for 1 hour and then was comminuted using a Waring blender. The powdered material was isolated by filtration, washed with water and dried in air and then at 150° C for 6 hours in vacuo. There was thus obtained a polyamide having the recurring unit:

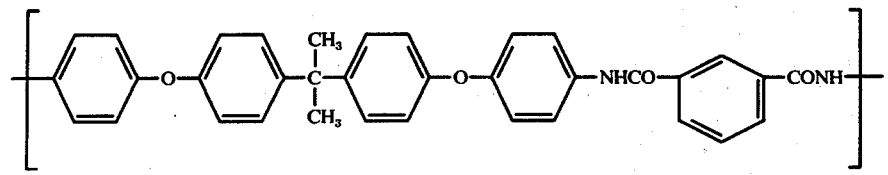

The polyamide had an inherent viscosity ($\eta$ 0.5) in dimethylacetamide of 1.08.

A sample of the material was compression molded as a 2 inches diameter ⅛ inch thick disc at 300° C and 4500 psi. A ¼ inch wide strip was cut and subjected to the Gehman Torsional Stiffness Test with the following results. The sample showed a glass transition temperature of 220° C but the modulus remained in the region of $10^7$ dynes/cm² at temperatures in excess of 300° C, making the product clearly unsuitable for injection molding.

EXAMPLE 8

A sample (25 g.) of the polyamide-imide prepared as described in Example 3 was compression molded using a 2 ½ × 5 inch bar mold preheated to 290° C and a pressure of 4000 psi. The molded part was cooled in the mold to 150° C and demolded. The transparent test pieces so obtained were submitted for physical testing and found to have the following properties:

| | |
|---|---|
| Specific gravity | : 1.256 g/cc |
| Tensile strength | : 12,600 psi |
| Tensile modulus | : 240,000 psi |
| Elongation at break | : 25% |
| Flexural strength | : 17,600 psi |
| Flexural modulus | : 370,000 psi |
| Izod impact | : 2.6 ft. lbs/in. |
| Rockwell hardness | : M-95.7 |
| Heat distortion temp. at 264 psi | : 215° C |

EXAMPLE 9

A copolyamide-imide in accordance with the invention was prepared as follows.

A solution of 30.75 g. (0.075 mole) of 2,2-bis[4-(p-aminophenoxy)phenyl]propane and 8.11 g. (0.075 mole) of m-phenylenediamine in 150 ml. of dimethylacetamide was stirred at −20° C under nitrogen while a total of 31.59 g. (0.15 mole) of powdered acid chloride of trimellitic anhydride was added with stirring over a period of 5 minutes. The temperature rose to a maximum of 10° C during the addition. After the addition was complete, the temperature of the reaction mixture was allowed to rise to that of the surrounding atmosphere and the reaction mixture was allowed to remain at this temperature for 15 hours. The resulting product was poured into an excess of deionized water. The precipitated solid was comminuted using a Waring blender and the powdered solid was isolated by filtration, washed with water, and dried in air. The intermediate polyamide acid so obtained was finally heated at 190° C in vacuo for 12 hours. There was thus obtained a copolyamide-imide of the invention. The polymer had an inherent viscosity ($\eta$ 0.5) in dimethylacetamide of 0.51.

A sample of the above polymer was compression molded as a 2 inch diameter and ⅛ inch thick disc at 300° C and 4500 psi. A ¼ inch wide strip was cut and subjected to the Gehman Torsional Stiffness Test. The sample showed a glass transition temperature of 240° C and good melt flow properties above 265° C indicating good injection moldability.

EXAMPLE 10

A solution of 30.79 g. (0.075 mole) of 2,2-bis[4-(p-aminophenoxy)phenyl]propane and 15.02 g. (0.075 mole) of 4,4'-diaminodiphenyl ether in 300 ml. of anhydrous dimethylacetamide (distilled from calcium hydride) was cooled to −18° C with stirring. A total of 31.58 g. (0.15 mole) of the powdered acid chloride of trimellitic anhydride was added over a period of 3 minutes while maintaining the temperature of the reaction mixture below −15° C. After the addition was complete, the stirring was maintained for 2 hours with a reaction mixture temperature of −20° C. At the end of 2 hours the cooling bath was removed and the mixture was allowed to rise to room temperature (circa 20° C). The stirring was continued at this temperature for 15 hours and the product was then poured into an excess of deionized water. After allowing the precipitate to stand for 1 hour, it was comminuted using a Waring blender. The resulting solid was isolated by filtration, washed with water and then methanol and air dried. The intermediate polyamide acid was heated in vacuo at 190° C for 12 hours to yield a copolyamide-imide of the invention. The polymer had an inherent viscosity ($\eta$ 0.5) in dimethylacetamide of 0.78.

A 2 inch diameter disc was compression molded at 298° C and 4000 psi pressure. A ¼ inch strip of the translucent molding was subjected to Gehman Torsional Stiffness Test. The sample showed a glass transition temperature of 232° C and good melt flow properties above 260° C indicating good injection moldability.

EXAMPLE 11

FOr purposes of comparison a polyimide was prepared from 2,2-bis[4-(p-aminophenoxy)phenyl]propane and pyromellitic dianhydride as follows.

A solution of 41.0 g. (0.1 mole) of the above diamine in 175 g. of anhydrous N-methylpyrrolidone (previously dried over calcium hydride) was maintained at 5° to 10° C with stirring while a total of 21.81 g. (0.1 mole) of pyromellitic dianhydride was added as dry powder over a period of 15 minutes. The last traces of powder were rinsed into the flask with 78 g. of N-methylpyrrolidone. The resulting mixture was stirred for a further 1 hour at 5° to 10° C and then at room temperature (circa 20° C) for 15 hours. An infrared spectrum of an aliquot showed no remaining anhydride at this point. Accordingly, 0.22 g. of dianhydride was added and stirring was continued for a further 2 hours. At the end of the latter an aliquot was examined by infrared spectroscopy and no excess anhydride could be detected. A further 0.22 g. of dianhydride was therefore added and stirring was continued for a further 2 hours at room temperature. Approximately 80 ml. of the resulting solution of polyamide-acid was removed and used to cast a film (see below). The remainder of the solution was converted to polyimide by adding 20.4 g. (0.2 mole) of acetic anhydride, 10.1 g. (0.1 mole) of triethylamine and 30.5 g. of anhydrous xylene. Th resulting mixture was stirred at room temperature and the polyimide began to separate from solution after about 1 hour. The material which separated was a crumbly gel which was isolated by decantation and dried under nitrogen. The gel was then suspended in water and comminuted using a Waring blender. The yellow solid was isolated by filtration, washed with acetone and dried at 180° C in vacuo for 12 hours.

It was found that this material could not be fused at temperatures as high as 400° C and was clearly not useful for extrusion or injection molding.

A film was cast from the 80 ml. of the polyamic acid solution retained as described above and the film was converted to polyimide by heating at 200° C in vacuo. The resulting film of polyimide was brittle and could not be removed from the substrate for physical testing. Experiment was therefore repeated to obtain a useful film (Film A) which was removed from the substrate and submitted to physical testing. A second film was prepared in identical manner but employing trimellitic anhydride in place of pyromellitic dianhydride in accordance with the procedure and reaction conditions described in Example 3 above. The intermediate amide-acid was cast as a film in the manner described above before being converted to an amide-imide of the invention. The second film (Film B) so obtained was also submitted to physical testing. The properties of the two films are set forth below from which it will be seen that Film B, derived from a polyamide-imide of the invention, is markedly superior in structural strength properties to Film A.

|  |  |  | Film A | Film B |
|---|---|---|---|---|
| Tensile strength | : | psi | 10,110 | 14,500 |
| Tensile modulus | : | psi | 308,300 | 386,400 |
| Elongation % | : |  | 6–12 | 8 |

EXAMPLE 12

Preparation of 2,2-bis[4-(p-isocyanatophenoxy)phenyl]propane.

A solution of 10.25 g. (0.025 mole) of 2,2-bis[4-(p-aminophenoxy)phenyl]propane in 200 ml. of chlorobenzene was added slowly with stirring to a saturated solution of phosgene (9.9 g.) in 200 ml. of chlorobenzene maintained at about 10° C. The addition was complete in 30 minutes. The resulting mixture was heated slowly, with stirring, to 100° C and the excess phosgene was allowed to reflux. After about 4 hours at 100° C the temperature of the reaction mixture was raised to 130° C for 2 hours. At the end of this time the infrared spectrum showed a strong absorption band at 4.4$\mu$ but no absorption at 2.9$\mu$ (NH$_2$). The resulting mixture was cooled and the excess chlorobenzene was distilled under reduced pressure. The residue was extracted with hot petroleum ether (total of 1000 ml.) and the extract was allowed to stand in the refrigerator overnight. The solid (5 g.) which separated was isolated by filtration, washed with petroleum ether and dried. There was thus obtained 2,2-bis[4-(p-isocyanatophenoxy)phenyl]propane in the form of a crystalline solid having a melting point of 68° to 69° C.

I claim:

1. A polyamide-imide characterized by the presence in random arrangement of at least two recurring units having the formulae:

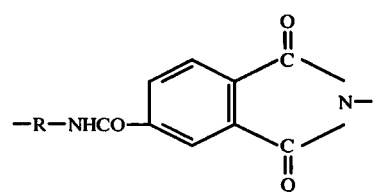

and

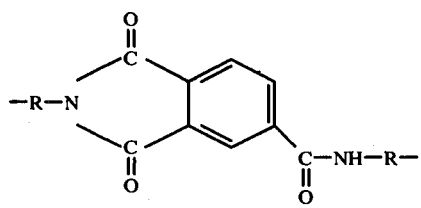

-continued

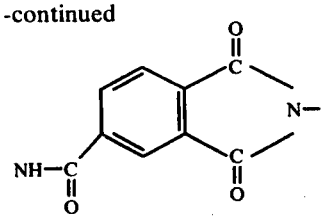

wherein R in each case represents

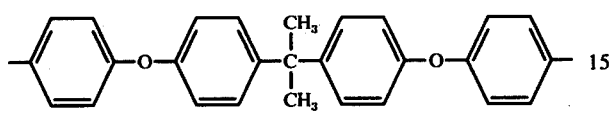

2. A copolyamide-imide according to claim 1 in which up to 50 percent of the divalent radicals R in said recurring units are selected from the class consisting of

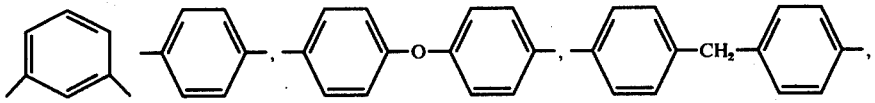

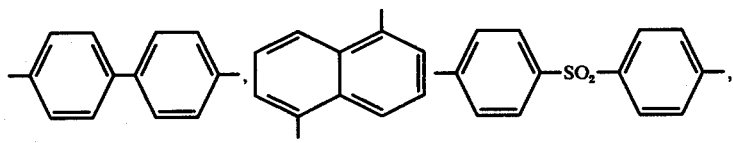

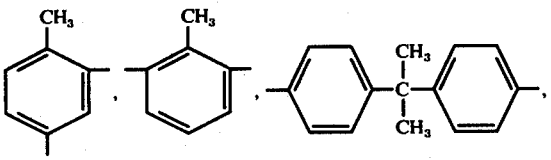

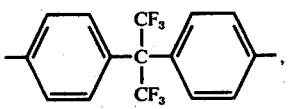

and mixtures thereof.

3. A copolyamide-imide according to claim 1 in which up to 50 percent of the divalent radicals in said recurring units are

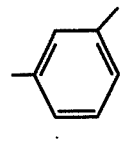

4. A copolyamide-imide according to claim 1 in which up to 50 percent of the divalent radicals in said recurring units are

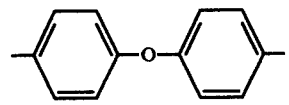

5. A polyamide-imide according to claim 1 having a molecular weight number average ($M_n$) in the range of about 5,000 to about 15,000 and a molecular weight weight average ($M_w$) in the range of about 10,000 to 120,000.

* * * * *

UNITED STATES PATENT OFFICE
CERTIFICATE OF CORRECTION

Patent No. 4,017,459  Dated April 12, 1977

Inventor(s) Besir K. Onder

It is certified that error appears in the above-identified patent and that said Letters Patent are hereby corrected as shown below:

Column 9, line 13:  Should read:

21°C  220°C

Signed and Sealed this

Twenty-eighth Day of June 1977

[SEAL]

*Attest:*

RUTH C. MASON
*Attesting Officer*

C. MARSHALL DANN
*Commissioner of Patents and Trademarks*